(12) United States Patent
Yuyama et al.

(10) Patent No.: US 7,871,234 B2
(45) Date of Patent: Jan. 18, 2011

(54) CART TRANSPORT APPARATUS

(75) Inventors: Shoji Yuyama, Toyonaka (JP);
Takayuki Fujikawa, Toyonaka (JP);
Takashi Itou, Toyonaka (JP); Hiromichi Tsuda, Toyonaka (JP)

(73) Assignee: Yuyama Mfg. Co., Ltd., Osaka (JP)

( * ) Notice: Subject to any disclaimer, the term of this patent is extended or adjusted under 35 U.S.C. 154(b) by 764 days.

(21) Appl. No.: 11/587,544

(22) PCT Filed: Apr. 27, 2005

(86) PCT No.: PCT/JP2005/008024
§ 371 (c)(1),
(2), (4) Date: May 11, 2007

(87) PCT Pub. No.: WO2005/105620
PCT Pub. Date: Nov. 10, 2005

(65) Prior Publication Data
US 2007/0297879 A1    Dec. 27, 2007

(30) Foreign Application Priority Data
Apr. 30, 2004    (JP) .............................. 2004-136521

(51) Int. Cl.
*B60P 1/64*    (2006.01)
*B60P 3/06*    (2006.01)
(52) U.S. Cl. ............. 414/498; 280/33.997; 280/33.998; 410/7
(58) Field of Classification Search ................. 414/396, 414/401, 498; 410/7; 280/33.997, 33.998
See application file for complete search history.

(56) References Cited

U.S. PATENT DOCUMENTS

| 3,628,624 | A | * | 12/1971 | Wesener | 180/168 |
| 3,647,014 | A | * | 3/1972 | Wilke et al. | 180/14.1 |
| 4,062,465 | A | * | 12/1977 | Kovatch et al. | 414/499 |
| 4,077,535 | A | * | 3/1978 | Oriol | 414/498 |
| 4,137,984 | A | * | 2/1979 | Jennings et al. | 180/19.1 |

(Continued)

FOREIGN PATENT DOCUMENTS

BR    940040-9    7/1994

(Continued)

OTHER PUBLICATIONS

Chinese Office Action issued Sep. 11, 2009 in corresponding Chinese Patent Application No. 200580013873.5 (with English translation).

*Primary Examiner*—James Keenan
(74) *Attorney, Agent, or Firm*—Wenderoth, Lind & Ponack, L.L.P.

(57) ABSTRACT

A cart transport apparatus for automatically transporting carts in which trays with medicine contained therein can be stored. The carts have a plurality of support panels (38) juxtaposed to each other, a lower connection member (41) connecting lower end portions of the plurality of support panels (38), and casters (44) positioned below the lower connection member (41). The cart transport apparatus includes a frame (51) having wheels (50) that can be rotatably driven. The frame (51) is movable beneath the lower connection member (41) of the cart (8). Also, the cart transfer apparatus is provided with grip members (55) for gripping the lower connection member 41 of the cart 8.

10 Claims, 14 Drawing Sheets

U.S. PATENT DOCUMENTS

| | | | | |
|---|---|---|---|---|
| 4,697,974 A | * | 10/1987 | Eltoukhy | 414/331.09 |
| 4,775,023 A | * | 10/1988 | Shimada et al. | 180/168 |
| 5,072,960 A | * | 12/1991 | Sperko | 280/47.34 |
| 5,224,812 A | * | 7/1993 | Oslin et al. | 414/401 |
| 5,228,824 A | * | 7/1993 | Satoyoshi | 414/501 |
| 5,431,521 A | * | 7/1995 | Napierkowski et al. | 414/401 |
| 5,544,467 A | | 8/1996 | Focke | |
| 5,683,220 A | * | 11/1997 | Oh et al. | 414/529 |
| 5,727,360 A | | 3/1998 | Focke | |
| 6,082,956 A | * | 7/2000 | Pentland | 414/495 |
| 6,481,521 B2 | * | 11/2002 | Sugiyama et al. | 180/168 |
| 7,806,644 B2 | * | 10/2010 | Yuyama et al. | 414/331.06 |
| 7,806,646 B2 | * | 10/2010 | Riordan et al. | 414/498 |
| 2003/0020383 A1 | | 1/2003 | Yuyama et al. | |
| 2004/0074685 A1 | * | 4/2004 | Tham | 180/168 |
| 2006/0210382 A1 | * | 9/2006 | Mountz et al. | 414/498 |

FOREIGN PATENT DOCUMENTS

| | | | | |
|---|---|---|---|---|
| CA | 2 113 003 | | 3/2001 | |
| CA | 2 395 523 | | 7/2002 | |
| CN | 1097395 | | 1/1995 | |
| CN | 1400147 | | 3/2003 | |
| DE | 43 00 149 | | 7/1994 | |
| EP | 0 605 838 | | 12/1993 | |
| EP | 0 731 023 | | 12/1993 | |
| EP | 1 279 355 | | 1/2003 | |
| FR | 2631948 A1 | * | 12/1989 | 414/498 |
| JP | 1-175007 A | * | 7/1989 | 180/168 |
| JP | 8-310625 | | 11/1996 | |
| JP | 9-77210 | | 3/1997 | |
| JP | 10-72011 | | 3/1998 | |
| JP | 10-138917 | | 5/1998 | |
| JP | 2000-159098 | | 6/2000 | |
| JP | 2003-159134 | | 6/2003 | |

* cited by examiner (a)

(b)

(a)

(b)

(c)

CART TRANSPORT APPARATUS

BACKGROUND OF THE INVENTION

1. Technical Field

The present invention relates to a cart transport apparatus.

2. Description of the Related Art

Conventionally, in the case of transporting medicine from a pharmacy department, medicine for one patient is contained in a tray, which is automatically transported to a nurse station using a transport unit (see, for example, JP A 8-310625). As it is inefficient to transport the medicine separately from the nurse station to each patient's room, the trays are stored in a cart and the cart is transported.

However, conventionally, there has been no apparatus for automatically transporting the cart.

SUMMARY OF THE INVENTION

It is an object of the present invention to provide a cart transport apparatus which makes it possible to automatically transport carts in which trays with medicine contained therein can be stored.

The present invention provides a cart transport apparatus for transporting a cart provided with a plurality of storage areas in each of which trays with medicine contained therein are stored.

The cart includes a plurality of support panels juxtaposed to each other, a lower connection member connecting the lower end portions of the plurality of support panels and casters positioned below the lower connection member. The cart transport apparatus includes a frame having wheels which can be driven to rotate. The frame is movable beneath the lower connection member of the cart and a grip member for gripping the lower connection member of the cart.

According to this construction, moving the frame beneath the cart and driving the grip member allows the grip member to grip the lower connection portion of the cart. Rotating the wheels to move the frame allows the cart to be transported. As the frame is movable beneath the lower connection portion, the frame can freely move to a predetermined cart even if a plurality of carts is disposed.

Preferably, the grip member is comprised of at least one assembly of a pair of grip arms. Each or the grip arms comprises an upper plate portion, a lower plate portion and a side plate portion for guiding three surfaces of the lower connection member except one side surface. The pair of grip arms may pivot in synchronization with each other so that the side plate portions can guide both side surfaces of the lower connection portion respectively.

According to this construction, even if the positional relation between the lower connection portion and the grip member is displaced to some extent, pivoting operation of the grip arm allows the grip member to surely grip the lower connection portion.

Preferably, the apparatus further Comprises a cart detection portion for detecting the lower connection portion of the cart; and a control portion for driving the grip member based on a detection signal of the cart detection portion to grip the lower connection member.

According to this construction, the grip arms are able to more accurately grip the lower connection portion.

Preferably, the grip member is comprised of two assemblies of the pair of grip arms disposed on both sides of the frame. The cart detection portion is comprised of two assemblies of a plural group of sensors juxtaposed in a width direction of the lower connection member. Also, the control portion decides whether or not the cart is positioned at an appropriate position based on detection signals of the plural group of sensors and if the cart is not positioned at the appropriate position, the control portion stops driving the grip member.

According to this construction, it is possible to determine whether or not the grip arm can surely grip the lower connection portion based on whether or not the plural group of sensors detects the lower connection portion. Therefore, when the grip arm is pivoted, the grip arm never fails to grip the lower connection portion.

Preferably, the apparatus further comprises a detection portion for detecting an obstacle during movement of the frame, and, when the frame approaches the cart, if the control portion decides that the frame has moved to a predetermined distance based on a detection signal of the detection portion, the control portion restrains the moving speed of the cart.

In accordance with this construction, it is possible to move the frame so that the grip member can effectively surely grip the lower connection portion.

Preferably, the apparatus further comprises a communication portion capable of receiving a state of transport address of the cart. The control portion decides whether or not the cart can be transported based on the state of transport address of the cart received at the communication portion.

In accordance with this construction, it is possible to effectively transport the cart while confirming the state of transport address of the cart.

According to the present invention, as the lower connection portion of the cart is gripped by the grip member provided on the frame which is movable beneath the cart, it is possible to transport the cart regardless of whether or not the trays are stored in the cart.

EXPLANATION OF THE REFERENCE NUMERALS

Figure 1:
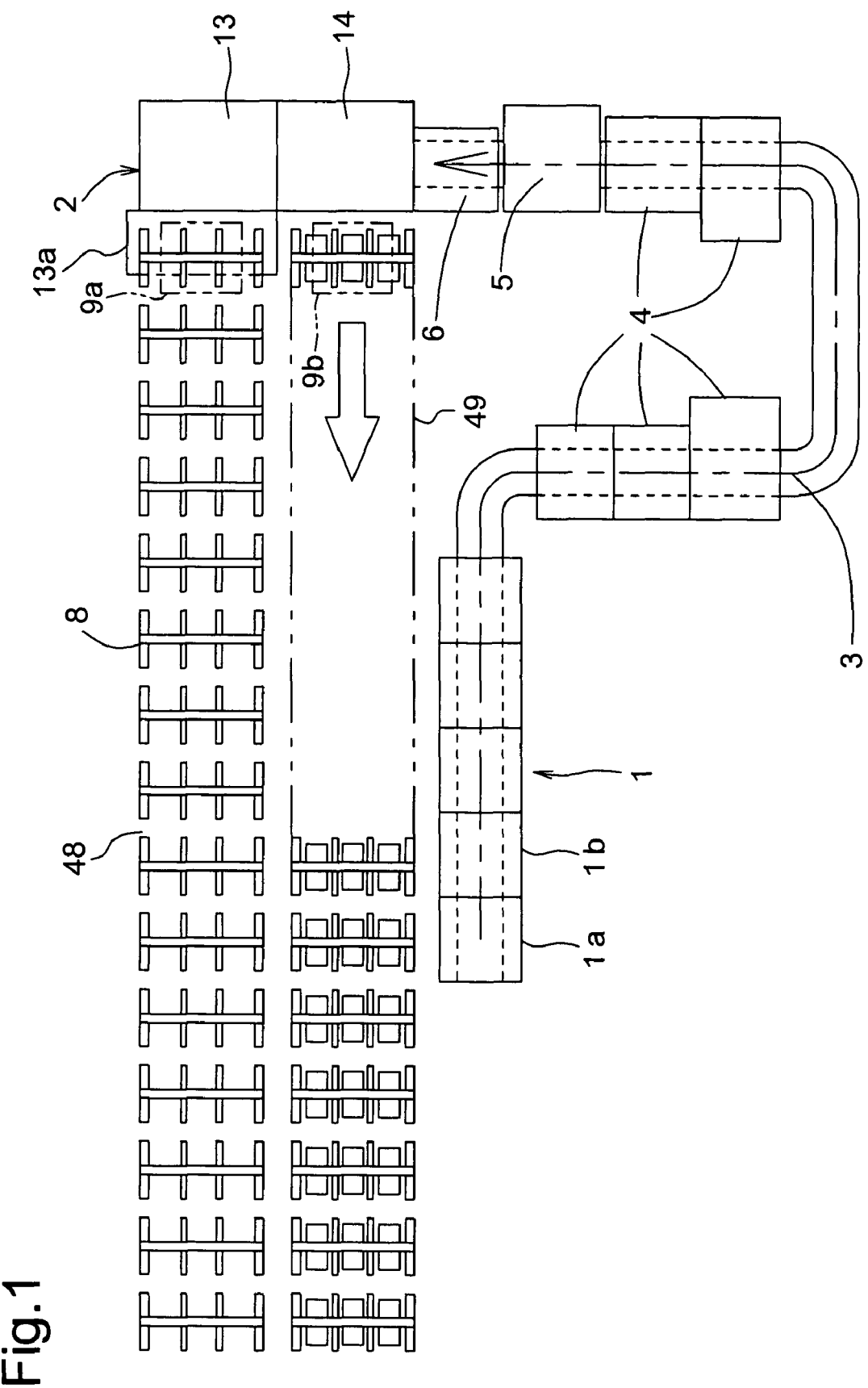
FIG. 1 is a general view showing an outline of a medicine supply system according to an embodiment of the present invention.

1 Supply lifter
2 Tray discharge unit
3 Tray transport line
4 Medicine dispensing unit
5 card rewriting unit
6 Stack lifter
7 Tray
8 Cart
9 Cart transport unit
10 Control unit
11 Flange portion
12 Identification card
13 Cart standby portion
14 Tray supply portion
15 Cart shift member
16 First optical communication portion
17 First guide member
18 Elevation motor
19 Gear
20 Guide piece
21 Tray shift unit
22 Vertical rail
23 Horizontal rail
24 Tray holding member
25 Arm portion
26 Pushing portion
27 Second optical communication portion
28 Electromagnet portion
29 Second guide member
30 Guide roller
31 Guide cover
32 Driving belt
33 Slider
34 Pusher
35 Pulley
36 Gear
37 Shift motor
38 Support panel
39 Leg portion
40 Upper connection portion
41 Lower connection portion
42 Grip
43 Support portion
44 Caster
45 Guide groove
46 Storage area
47 Reflection plate
48 Cart supply line
49 Cart discharge line
50 Wheel
51 Frame
52 Drive motor
53 Detection member
54 Control substrate
55 Grip member
56 Bearing member
58 Cart detection sensor
59 Position deviation detection sensor
60 Detection sensor
61 Third optical communication portion
62 Pulse driver
63 Signal converter
64 Grip arm
65 Drive shaft
66 Driven shaft
67 Drive gear
68 Driven gear
69 Support table
70 Sensor dog
71 Position detection sensor
72 Current collecting arm
73 Slit
74 Power supply unit.
75 Guide rail
76 Trolley
77 Cover
78 Server
79 Input unit

DESCRIPTION OF THE PREFERRED EMBODIMENTS

Hereinafter, embodiments of the present invention will be described with reference to the accompanying drawings.

Figure 2:
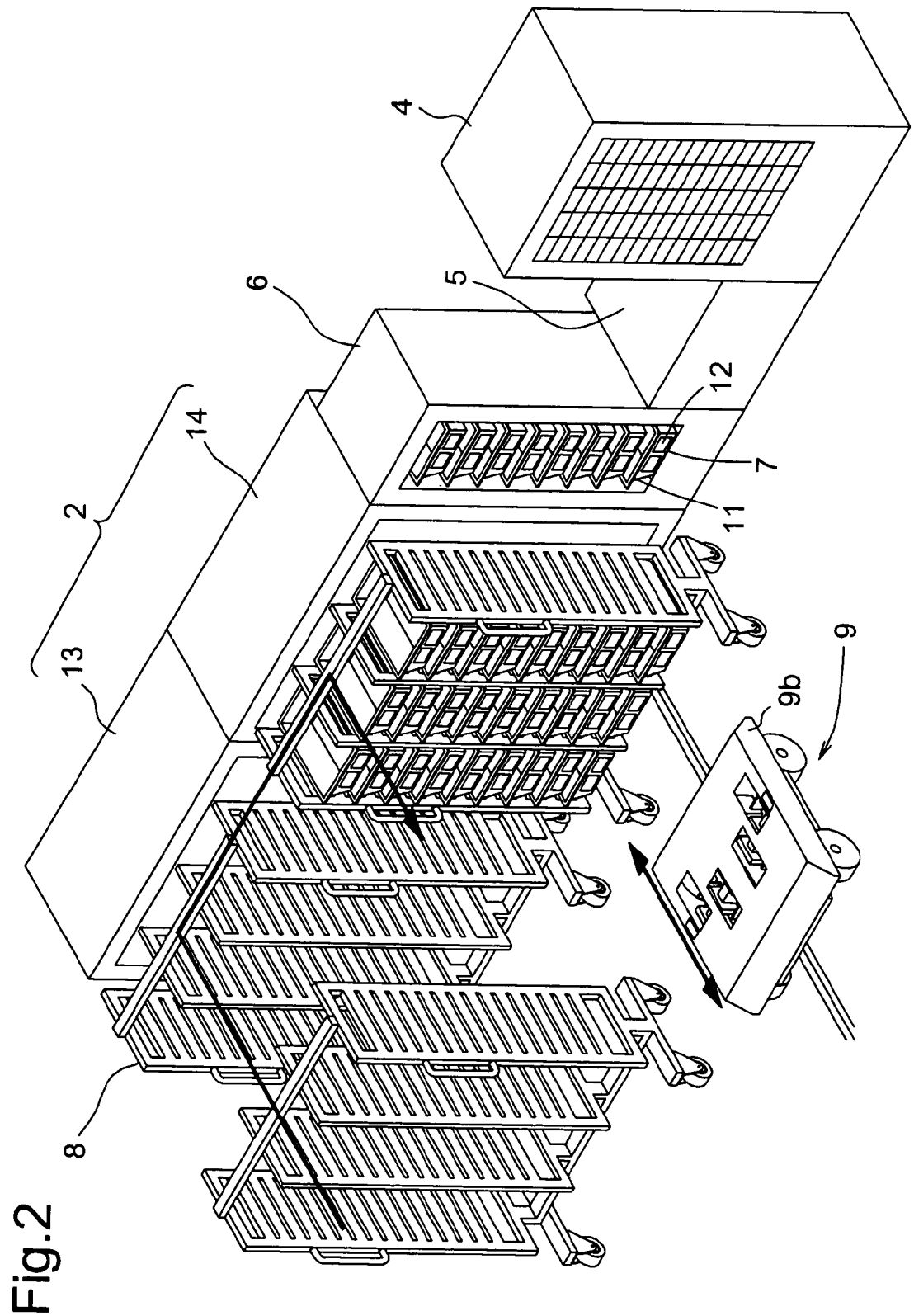
FIG. 2 is a perspective view showing a tray discharge unit of FIG. 1.
Figure 11:
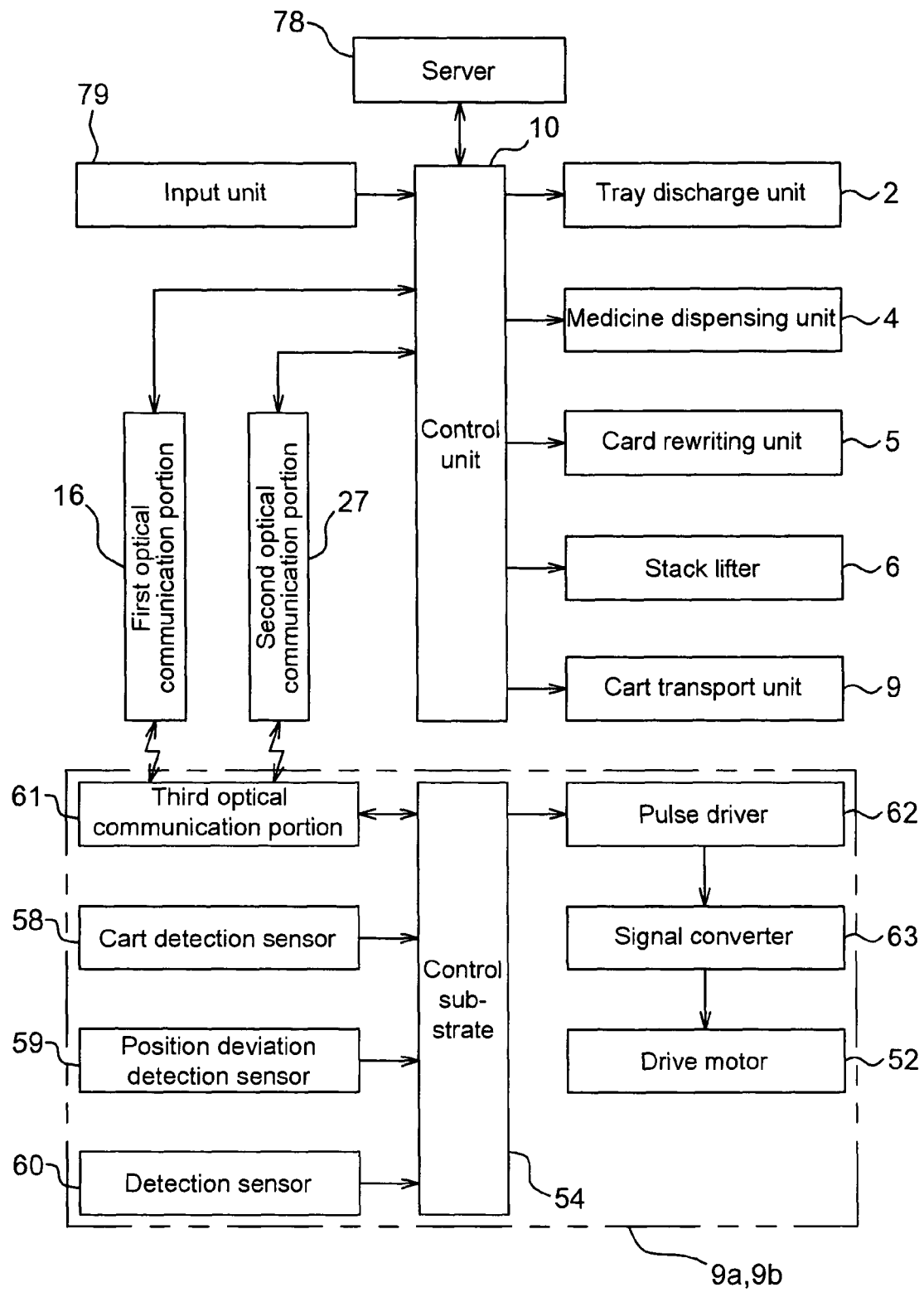
FIG. 11 is a block diagram showing a control unit of the medicine supply system according to the present invention.

FIG. 1 shows a medicine supply system according to an embodiment of the present invention. In the medicine supply system, a plurality of medicine dispensing units 4, card rewriting unit 5 and a stack lifter 6 are disposed along a-tray transport line 3 connecting a supply lifter and a tray discharge unit 2. As shown in FIG. 2, there is provided a cart transport unit 9 that transports empty carts 8 to the tray discharge unit 2 and transports the carts 8 with trays 7 stored therein. As shown in FIG. 11, these members are controlled by a control unit 10.

Figure 3:
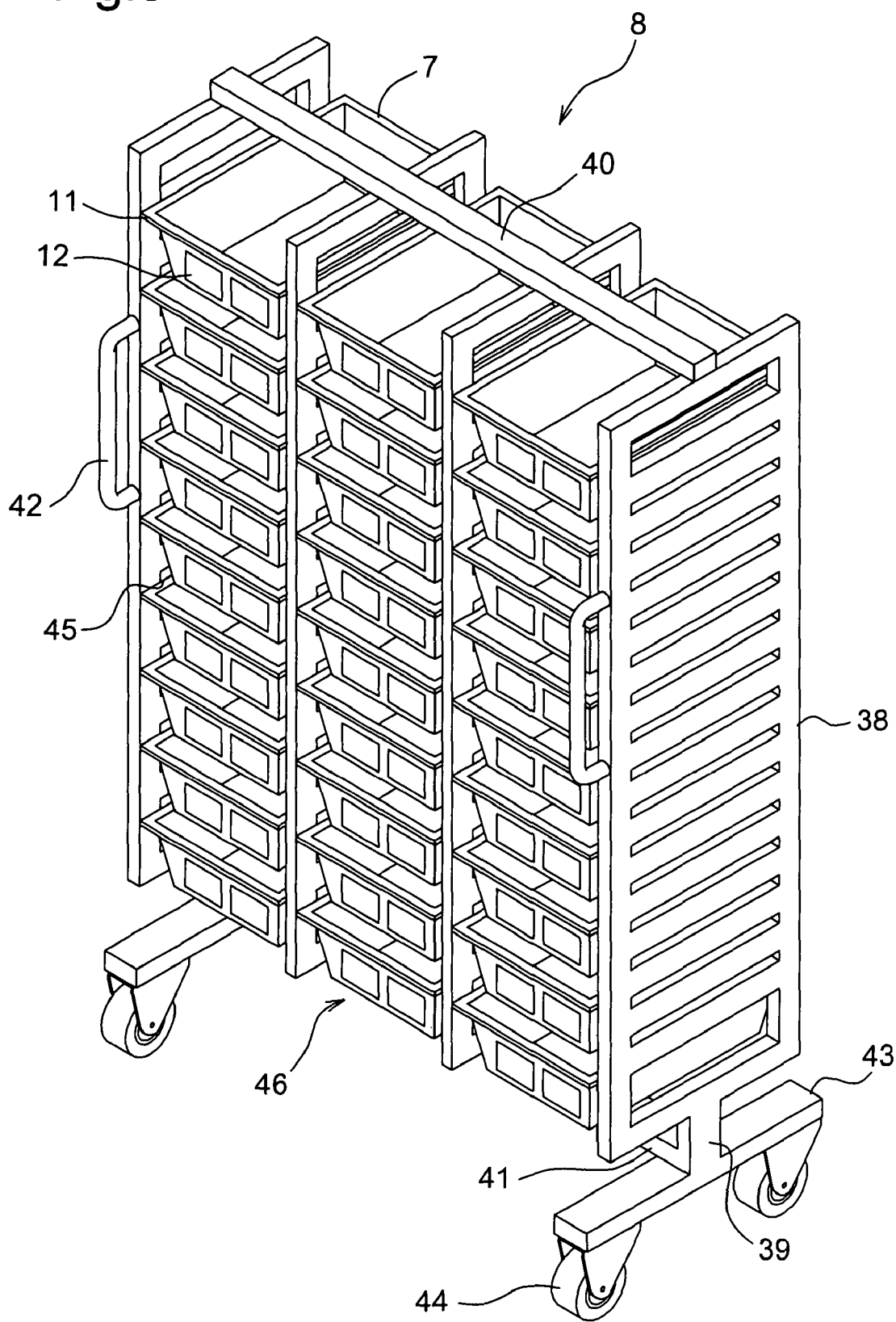
FIG. 3 is a perspective view of a cart with the trays stored therein.
Figure 4:
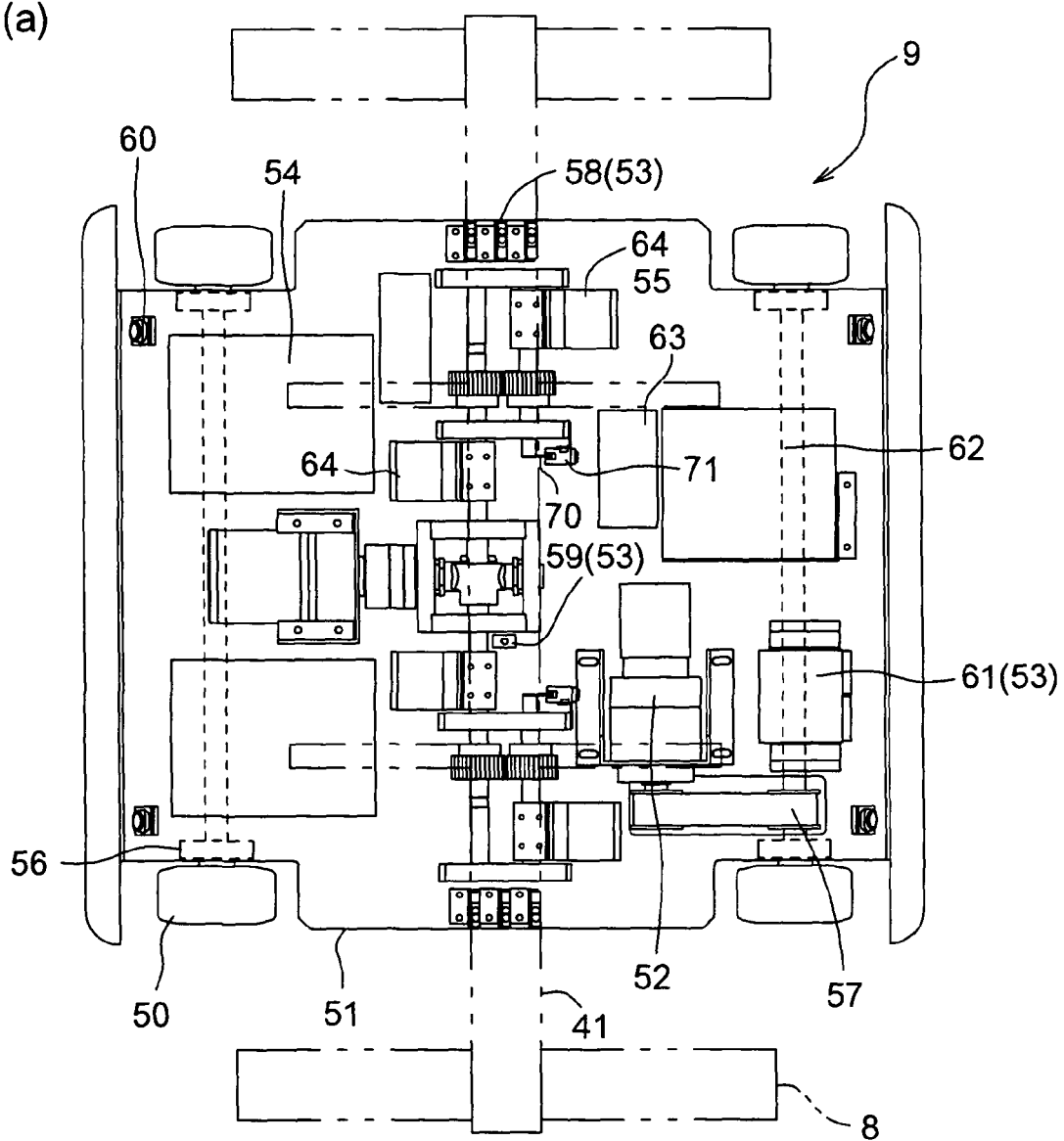
FIG. 4(a) is a plan view showing an internal construction of a tray transport unit and FIG. 4(b) is a front view of FIG. 4(a)
Figure 4:
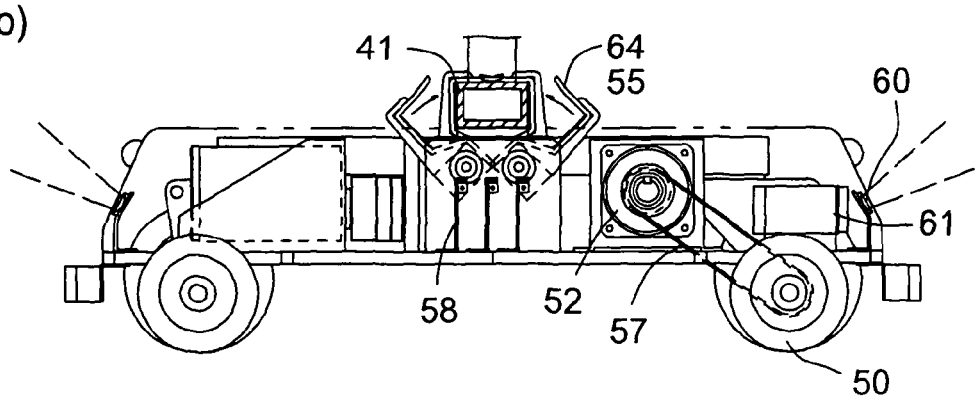

The supply lifter 1 stores a plurality of trays 7 in a stacked state and sequentially discharges the plurality of trays one-by-one to the tray transport line 3. Each tray 7, as shown in FIG. 3, has a box shape with an open upper surface and a flange portion 11. On the side surface of the tray 7, an identification card 12 can be attached and detached. The identification card 12 can be a Lueco type or a thermochromic type of rewrite card or the like, which is rewritable by heating the card to a predetermined temperature. Patient information and the like can be written on the identification card 12.

Figure 7:
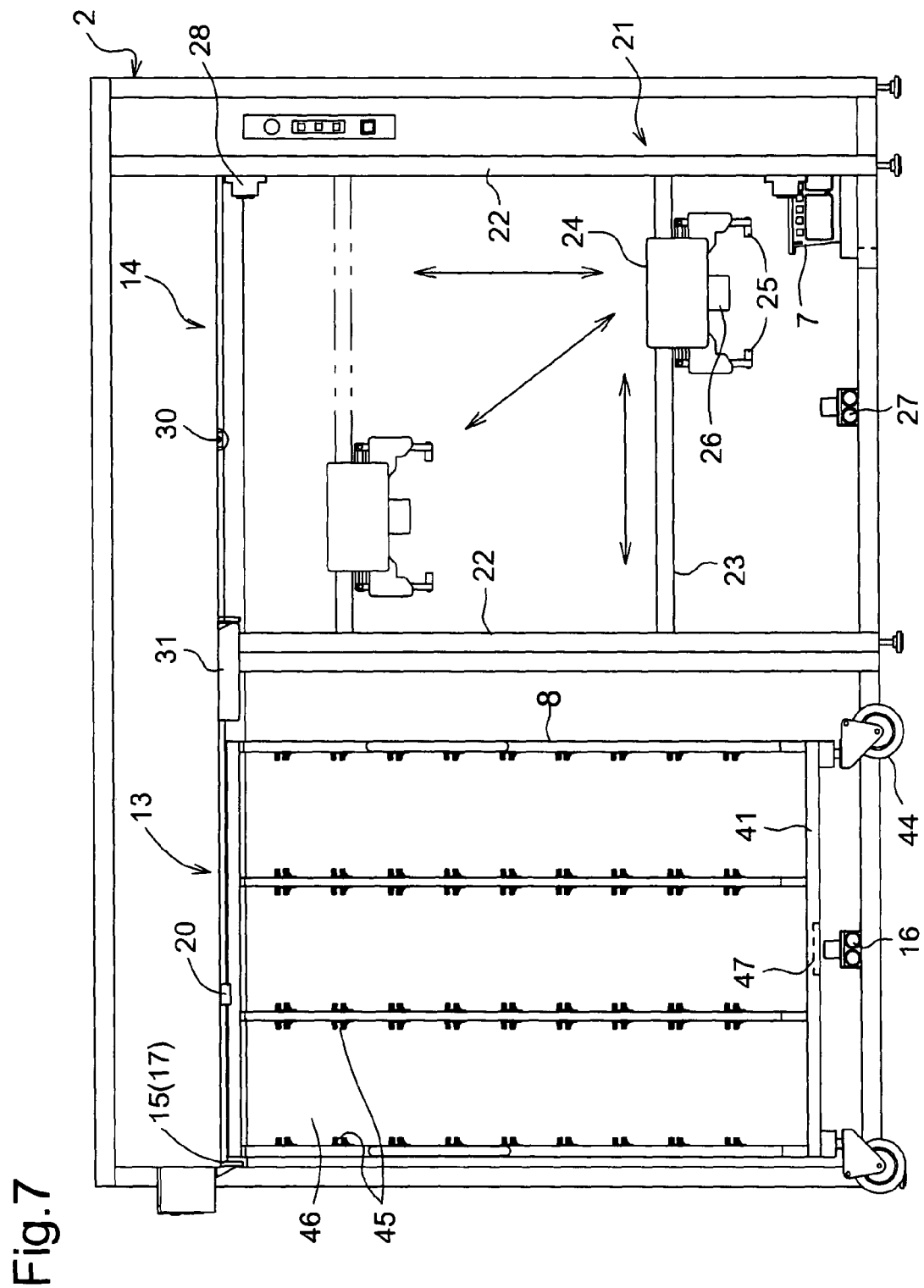
FIG. 7 is a front view of a tray discharge unit.

The tray discharge unit 2, as shown in FIGS. 2 and 7, comprises a cart standby portion 13 and a tray supply portion 14. A cart shift member 15 is provided on an upper part of the tray discharge unit 2. The tray discharge unit 2 sequentially stores the trays 7 with the medicine contained in the empty cart 8.

Figure 9:
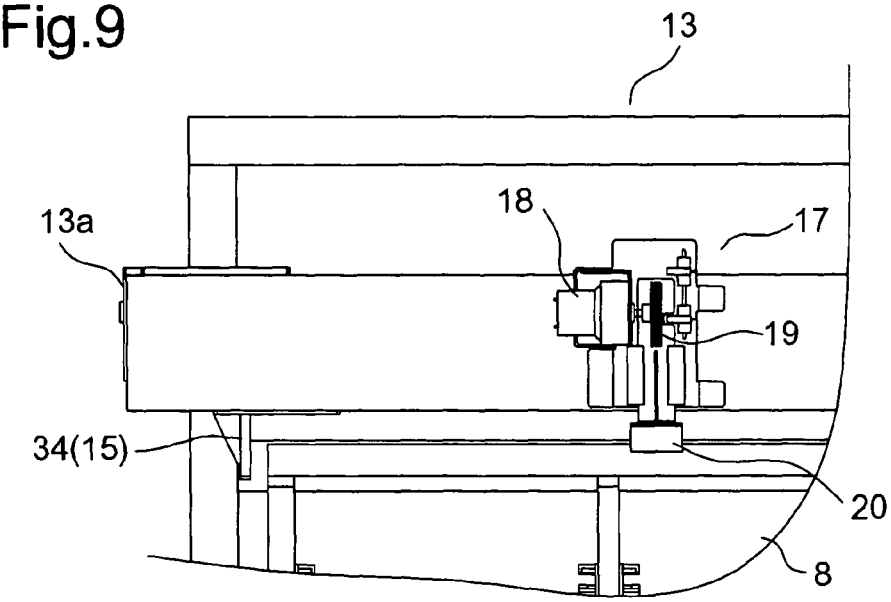
FIG. 9 is an enlarged view showing a part close to a first guide member of FIG. 7.

The cart standby portion 13, as shown in FIG. 7, comprises plate-like members assembled in a rectangular frame and ensures a space for putting the cart 8 on standby at a position along the tray discharge unit 13 in order to quickly shift the cart 8 to the adjacent tray supply unit 14. At the middle portion of the lower plate of the cart standby portion 13, a first optical communication portion 16 is provided. The first optical communication portion 16 conducts transmission and receipt of data with a third optical communication portion 61 provided in the cart transport unit 9 which will be described hereinafter. As shown in FIG. 9, a first guide member 17 is provided at the middle portion of an overhanging portion 13a of the cart standby portion 13. The guide member 17 moves a guide piece 20 up and down via a gear 19 by driving an elevation motor. When moving up, the guide piece 20 enables the cart 8 to enter into the cart standby portion 13 from the cart supply line 48. When moving down, the guide piece 20 guides the cart 8, which moves from the cart standby portion 13 to the tray supply portion 14 and prevents the next empty cart 8 from entering.

The tray supply portion 14, as shown in FIG. 7, has the shape of a rectangular frame and is provided with a tray transfer apparatus 21. The tray transfer apparatus 21 has a construction in which a horizontal rail 23 is provided slidably in a vertical direction on vertical rails 22 attached on the plate-like members on both sides of the tray supply portion and a tray holding member 24 is movably provided in a horizontal direction on the horizontal rail 23. The tray holding member 24 comprises arm portions 25 for holding the flange portions 11 of the tray 7 and a push portion 26 for pushing the tray 7 held by the arm portions 25 in a forward direction, i.e., toward the cart 8. The tray holding member 24 can move in both the X (horizontal) direction and the Y (vertical) direction to store the tray 7 in an appropriate storage area 46.

Figure 10:
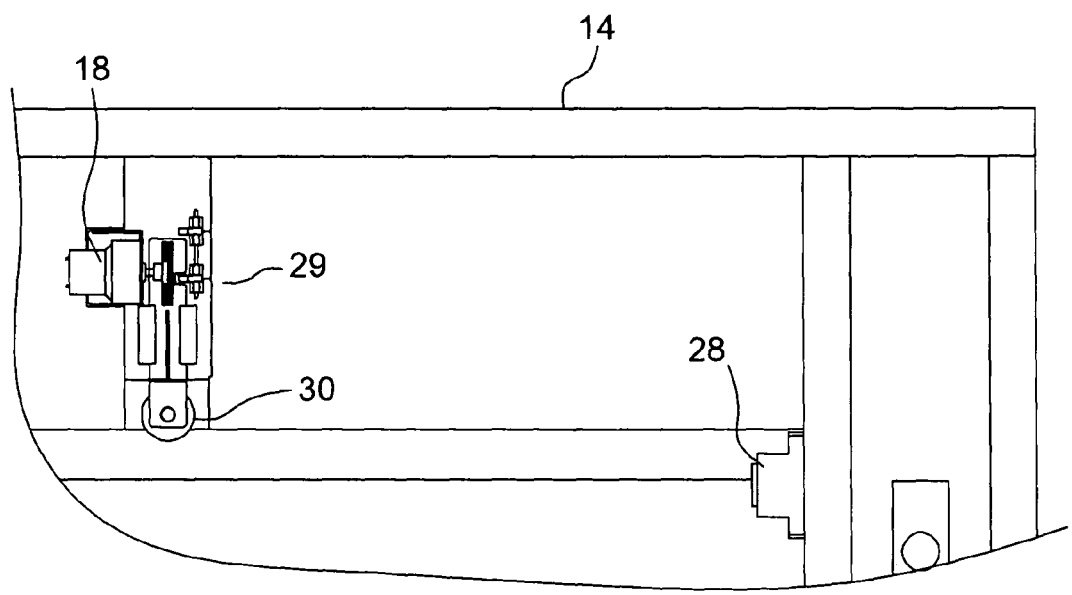
FIG. 10 is an enlarged view showing a part close to a second guide member of FIG. 7.

The tray supply portion 14 is provided with a second optical communication portion 27 which conducts transmission and reception of data with respect to a third optical communication portion 61 provided in the cart transfer apparatus 9 that will be described hereinafter. On the upper portion of a side plate of the tray supply portion, an electric magnet portion 28 is provided. The electric magnet portion 28 is energized upon the empty cart 8 being transferred by the cart transfer member 15 so that the cart 8 is attracted and positioned. This prevents positional displacement of the cart 8 when the trays are stored in the cart 8. A second guide member 29 is provided on the middle portion of the upper plate of the tray supply portion 14, as shown in FIG. 10. The second guide member 29 has the same construction as the first guide member 17. In the second guide member 29, a guide roller 30 is provided instead of the guide piece 20. The guide roller 30 descends to guide the cart 8 as it moves from the cart standby portion 13 to the tray supply portion 14 and ascends to enable the cart 8 to move from the tray supply portion 14 to the cart discharge line 49.

As shown in FIG. 7, a guide cover 31 is provided on the upper portion of the boundary between the cart standby portion 13 and the tray supply portion 14. The guide cover 31 has a substantially L-shaped plate-like body extending from the horizontal direction to the vertically lower direction. The guide cover 31 prevents displacement of the position of the cart 8 when the cart 8 moves from the cart standby portion 13 to the tray supply portion 14.

Figure 8:
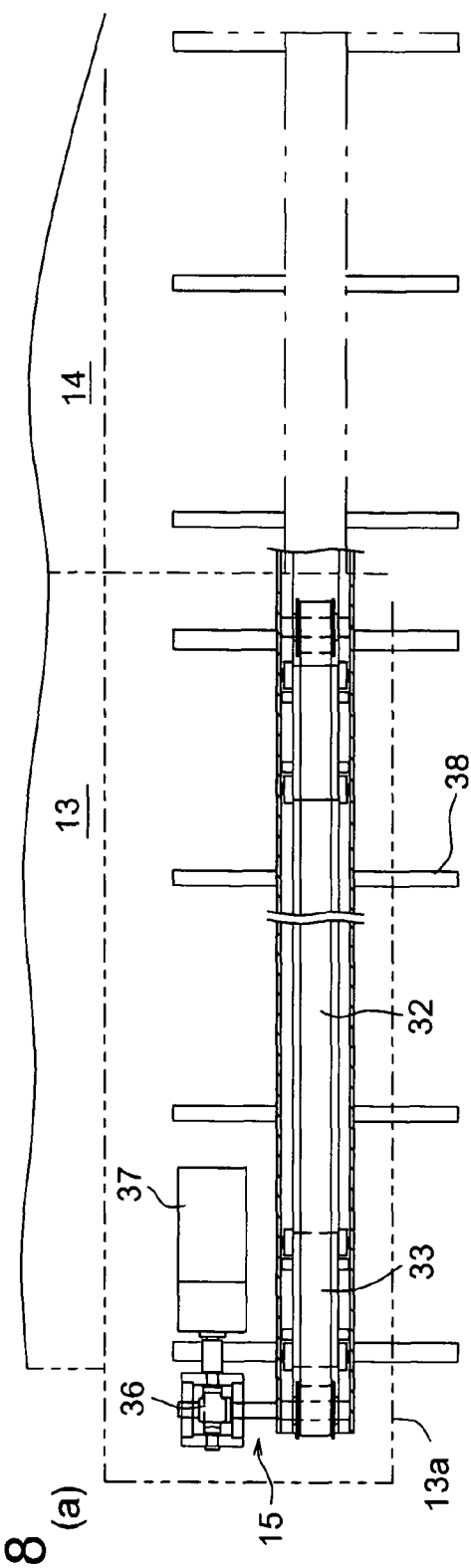
FIG. 8(a) is a plan view of FIG. 7
FIG. 8(b) is a front sectional view showing a part of FIG. 8(a)
Figure 8:
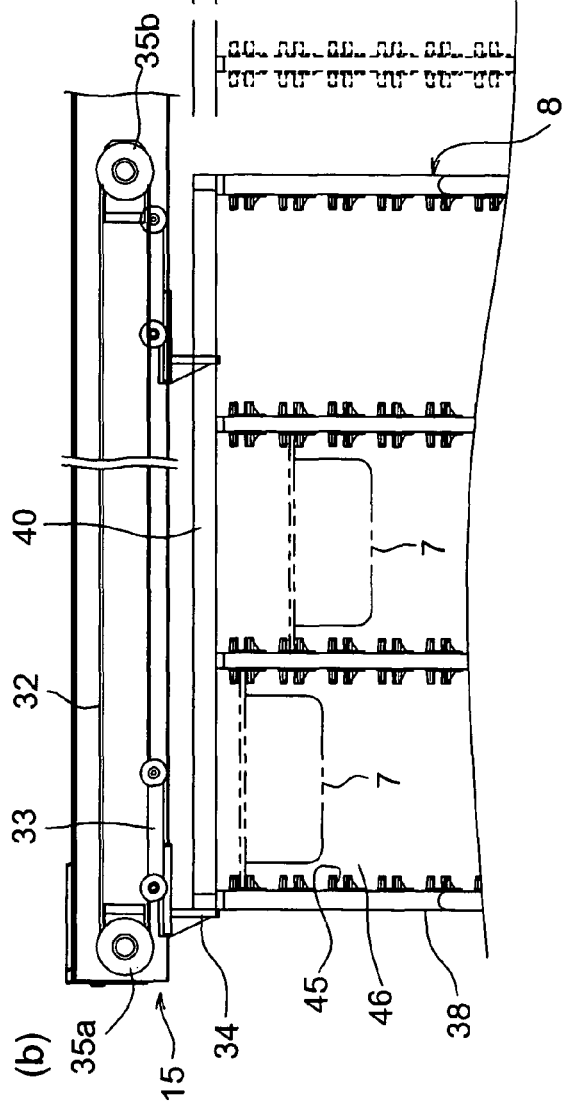

The cart transfer member 15, as shown in FIG. 8, comprises a drive belt 32 provided on the upper portion of the cart standby portion 13 and the tray supply portion 14, a slider 33 fixed on the drive belt and a pusher 34 extending downward from the slider 33. The belt 32 is engaged with pulleys 35a, 35b provided on both sides. A drive power is transferred to one pulley 35a via a pair of gears 36 from the shaft of the transfer motor 37. The pusher 34 is arranged to push the one end surface of the empty cart 8 disposed in the cart standby portion 13 to transfer it to the tray supply portion 14.

Figure 12:
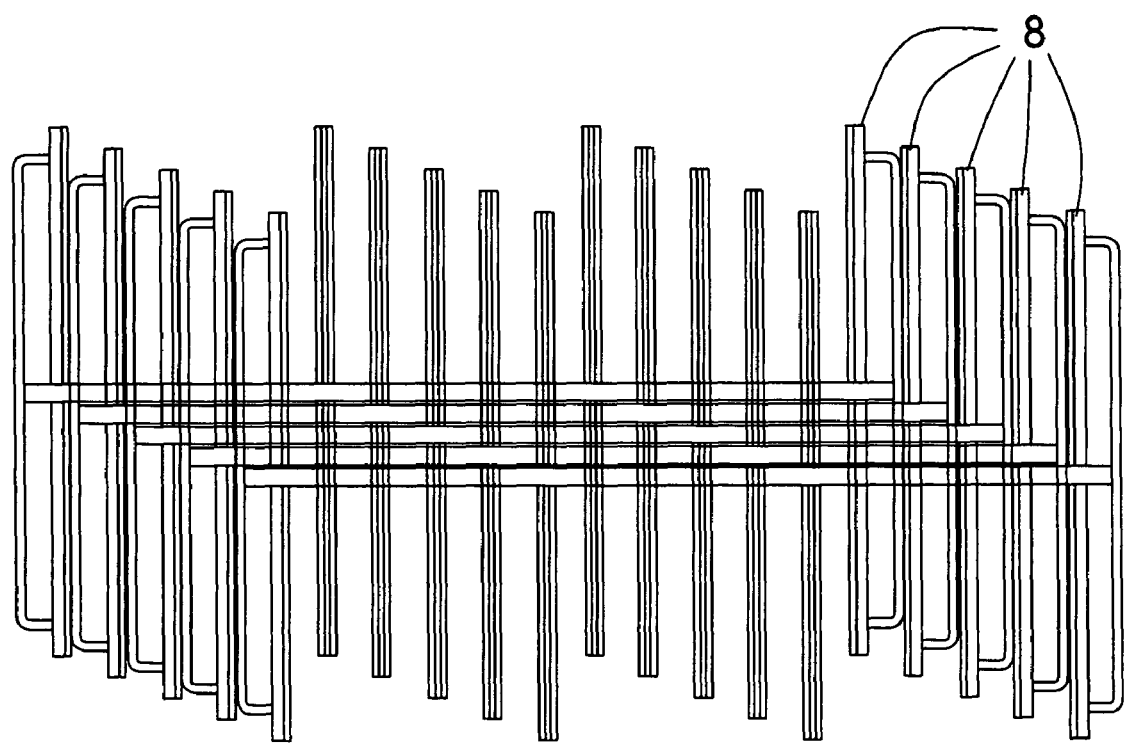
FIG. 12 is a plan view showing a state in which a plurality of carts is put together.

The cart 8, as shown in FIG. 3, is an integrated construction comprising four support panels 38 kept upright at a predetermined intervals, an upper connection member 40 connecting each middle portion of the upper ends of the support panels and a lower connection member 41 that connects each leg portion 39 protruded from the middle portions of lower ends of the support panels. In the support panels 38 positioned at both sides, grips 42 are provided respectively at the upper side edge portions. Also, casters 44 are provided respectively at both ends of a support portion 43 that extends from the lower end of the leg portion 39. Thus, holding the grips 42 allows the cart 8 to freely move. On the opposite surfaces of the support panels 38, guide grooves 45 are formed at predetermined intervals in a vertical direction. The opposite guide grooves 45 function to support the flange portions 11 of the trays 7 in storage areas 46. In the case where no tray 7 is stored in the storage area 46, it is possible to bring the carts 8 together as shown in FIG. 12 to reduce the necessary storage space. A reflection plate 47 (see FIG. 7) made of metal is provided on the middle portion of the lower surface of the lower connection member 41 so that the reflection plate 47 can be detected by a position displacement detection sensor 59 that will be described hereinafter.

The tray transfer line 3 is constructed so that a plurality of rollers (not shown) is driven to rotate and convey the tray 7 downstream, i.e., to the tray discharge apparatus 2.

The medicine dispensing apparatus 4 is constructed so that medicines can be packed by one dose based on prescription data inputted from a server 78 or the like and dispensed into the tray 7 that is conveyed on the tray transfer line 3. On the lower portion of the medicine dispensing apparatus 4, a stopper (not shown) is provided to stop the tray 7 moving along the tray transfer line 3 if required.

The card rewriting apparatus 5 is constructed so that a predetermined matter can be printed on the identification card 12 provided on the tray 7 and, if already printed, the content can be rewritten and reprinted.

The stack lifter 6 is constructed so that the trays 7, which have been conveyed with the medicine contained therein, can be stacked to put them on standby and then supplied to the tray discharge apparatus 2 sequentially.

The cart transfer apparatus 9 comprises a first cart transfer apparatus 9a for transferring the empty carts 8 aligned on the cart supply line 48 and a second cart transfer apparatus 9b for aligning the carts 8 in which the trays 7 are stored at the tray discharge apparatus 2 with the cart discharge line 49 (the lines on which the cart transfer apparatus 9b is disposed respectively are shown by two-dots chain line in FIG. 1).

Each of the cart transfer apparatuses 9a, 9b comprises a drive motor 52 (pulse motor), detection members 53, a control substrate 54, grip members 55 and so on which are provided on a frame 51 supported by four wheels 50. The wheels 50 are attached on both end portions of the rotation axes that are rotatably supported by bearing portions 56. A drive power of the drive motor 52 is transmitted to the rotation axes via drive transmission belt 57. As the detection members 53, cart detection sensors 58 on the middle portions of both sides, a position deviation sensor 59, search sensors 60 and a third optical communication sensor 61 are provided.

Each of the cart detection sensors 58 comprises three juxtaposed optical sensors each having a light emitting element and a light receiving element. A light irradiated from the light emitting element is reflected on the lower surface of the lower connection portion 41 of the cart 8 and received by the light receiving element so that the lower connecting portion 41 is detected. All of the sensors are disposed so as to simultaneously detect the lower connecting portion 41.

The position deviation sensor 59 is used to detect the reflection plate 47 provided on the cart 8 and to determine whether or not the cart 8 is positioned at the center of the cart supply line 48 or the cart discharge line 49, i.e. whether or not the cart 8 deviates from the center in the direction perpendicular to each line.

An ultrasonic sensor can be used, for example, as the detection sensor 60. The detection sensors 60 are disposed at a total of four places on both sides of the end portions of the cart transport unit 9, respectively to detect the cart 8. For example, the detection sensor 60 is used when accessing the cart 8 in order to grip the cart 8 by means of the grip member 55 which will be described hereinafter, when detecting the presence or absence of the cart 8, when transporting the gripped cart 8, when detecting whether or not the cart 8 bumps against another cart 8 and so on.

The third optical communication portion 61 conducts data transmission and reception with the first optical communication portion or the second optical communication portion 27 provided on the tray discharge unit 2.

The control substrate 54 controls the pulse signal which will be outputted to the drive motor 52 via the signal converter 63 from the pulse driver 62 based on the data received through the third optical communication portion 61.

Figure 6:
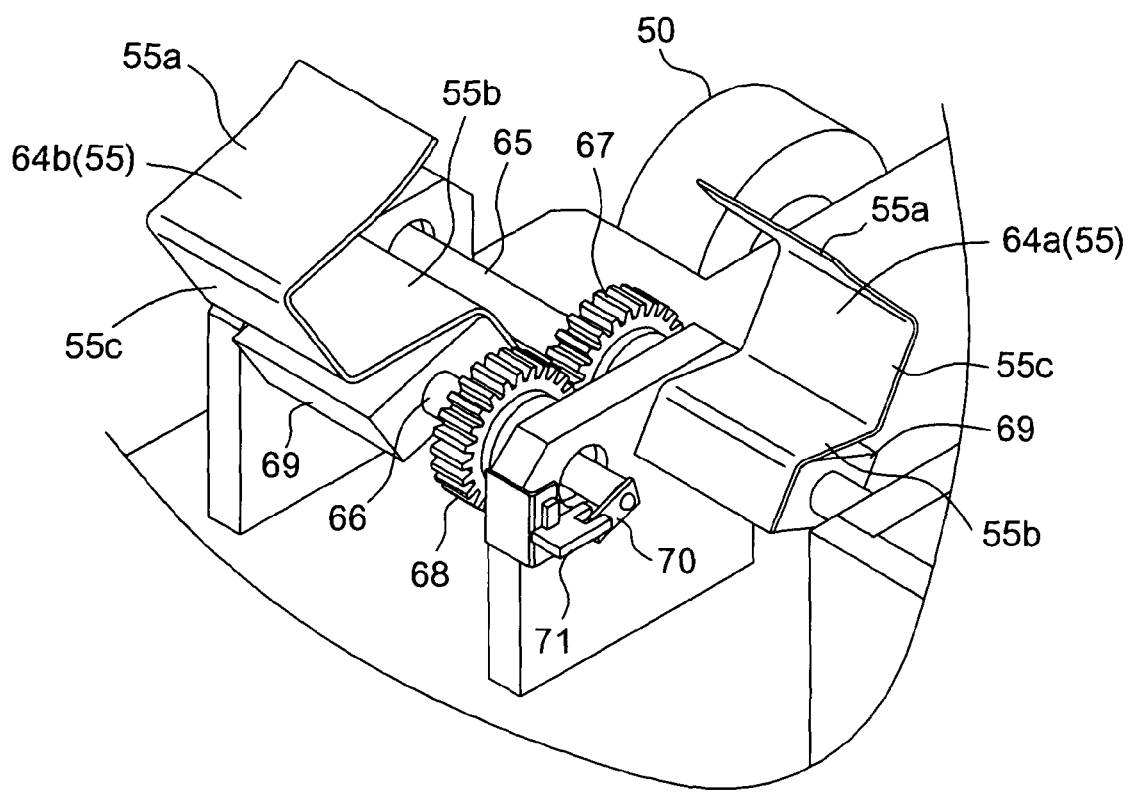
FIG. 6 is an enlarged perspective view showing a grip member provided on the tray transport unit.

Each of the grip members 55, as shown in FIG. 6, comprises a pair of grip arms 64a, 64b. The grip members 55 are disposed at the center portion of both sides of the frame 51, i.e. in the vicinity of each cart detection sensor 58, respectively. One grip arm 64a is fixed on the drive shaft 65 which is rotatable forwardly and reversely in response to drive of a motor (not shown). The other grip arm 64b is fixed on the driven shaft 66. A drive gear 67 provided on the drive shaft 65 and a driven gear 68 provided on the driven shaft 66 are engaged with each other so that the grip arms 64a, 64b rotate synchronously. Each of the grip arms 64a, 64b is made of metal plate material that is bent into an upper plate portion 55a, a lower plate portion 55b and a side plate portion 55c for guiding three surfaces (upper, loser and one side surfaces) except the other side surface of the lower connection portion 41 of the cart 8. The upper plate portion 55a and the lower plate portion 55b are formed so as to expand gradually toward the end from the side plate portion 55c, thereby enabling the lower connection portion 41 to be gripped without interference. Also, the grip arms 64a, 64b are elastically deformable themselves, which allows the absorption of some deviation and sure gripping of the lower connection portion 41. Each of the grip arms 64a, 64b are attached on support tables 69 having a substantially rectangular parallelepiped shape fixed on each of the shafts. The side plate portion 55c of one grip arm 64a and that of the other grip portion 64b can guide the lower connection portion 41 from the side surfaces. Therefore, even if the cart 8 is skewed by a certain degree with respect to the cart transport unit 9, it is possible to correct its position to a proper position. A sensor dog, provided on part of the driven shaft 66, is detected by a grip position detection sensor 71, thereby allowing the grip arms to stop their rotation.

Figure 5:
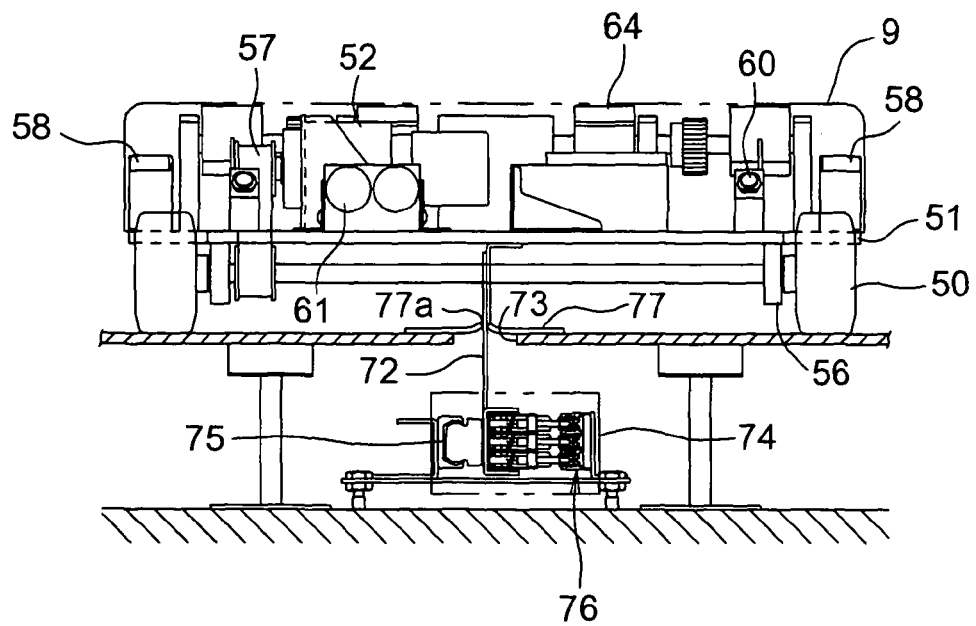
FIG. 5 is a front view showing an internal structure of the tray transport unit and floor.

In the frame 51 of the cart transport unit 9, as shown in FIG. 5, a current collecting arm 72 is provided so that it extends downwardly the from the bottom of the frame. The current collecting arm 72 serves as a power supply path for supplying power to the motor and the like.

On the floor constituting the car supply line 48 and the cart discharge line 49, as shown in FIG. 5, a slit 73 is formed. A power supply unit 74 is provided beneath the slit 71. In the power supply unit 74, a guide rail 75 and a trolley 76 for power supply are disposed so as to be opposed to each other. The guide rail 75 can guide the current collecting arm 72 and move the cart transport unit 9 along the line. The trolley 76 supplies power to the cart transport unit 9 via the current collecting arm 72. The upper opening portion of the slit 73 is covered by a cover 77 made of a flexible material. A slit 77a is formed in the cover 77 and the current collecting arm 72 is movable in the slit.

The control unit 10, as shown in FIG. 11, controls the drive of the medicine dispensing unit 4, each roller of the tray transport line 3, the tray discharge unit 2 and so on based on prescription data received from a server 78 and the like or data inputted by an input unit (for example, keyboard, mouse, touch panel and so on).

Next, the operation of the medicine supply system having above construction will be described.

First of all, the empty carts 8 are disposed and aligned on the cart supply line 48. That is to say, each of the carts 8 is disposed so that the lower connection portion 41 is orthogonal to the cart supply line 48 and both sides of the lower connection portion 41 are substantially equalized with respect to the cart supply line 48. This arrangement need not be so accurate.

Figure 14:
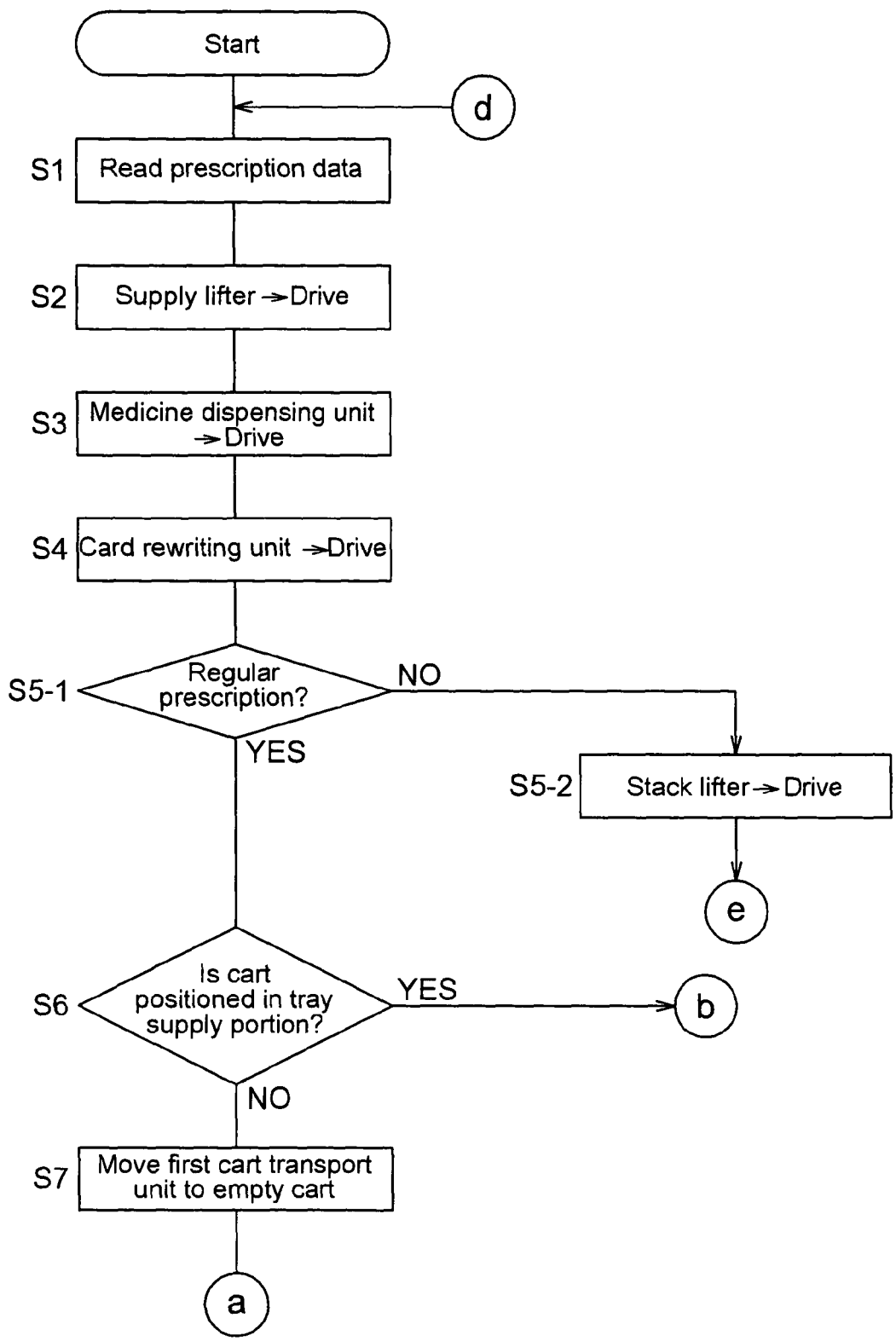
FIG. 14 is a flow chart showing processes in the medicine supply system according to the present invention.
Figure 15:
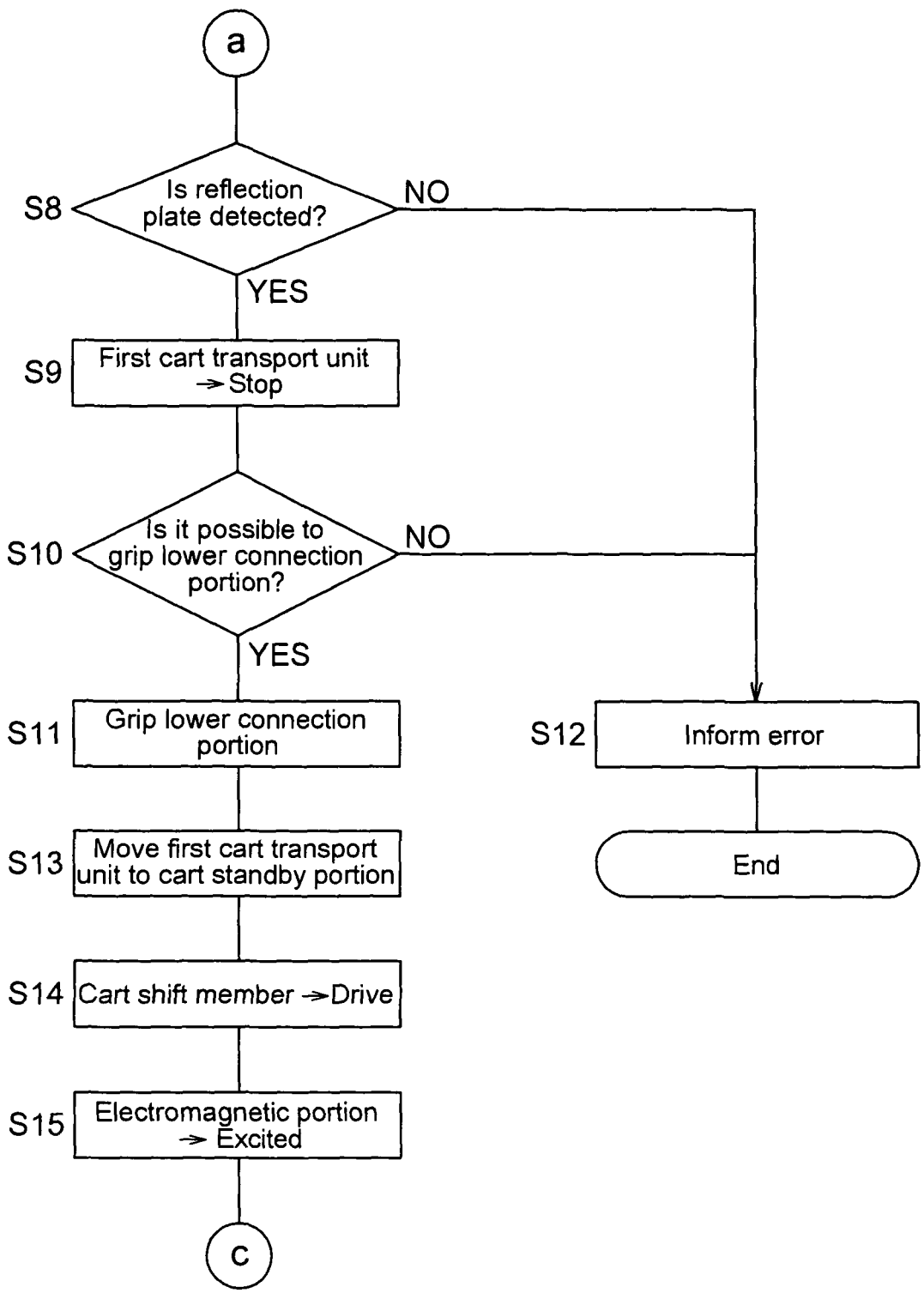
FIG. 15 is a flow chart continued from FIG. 14.
Figure 16:
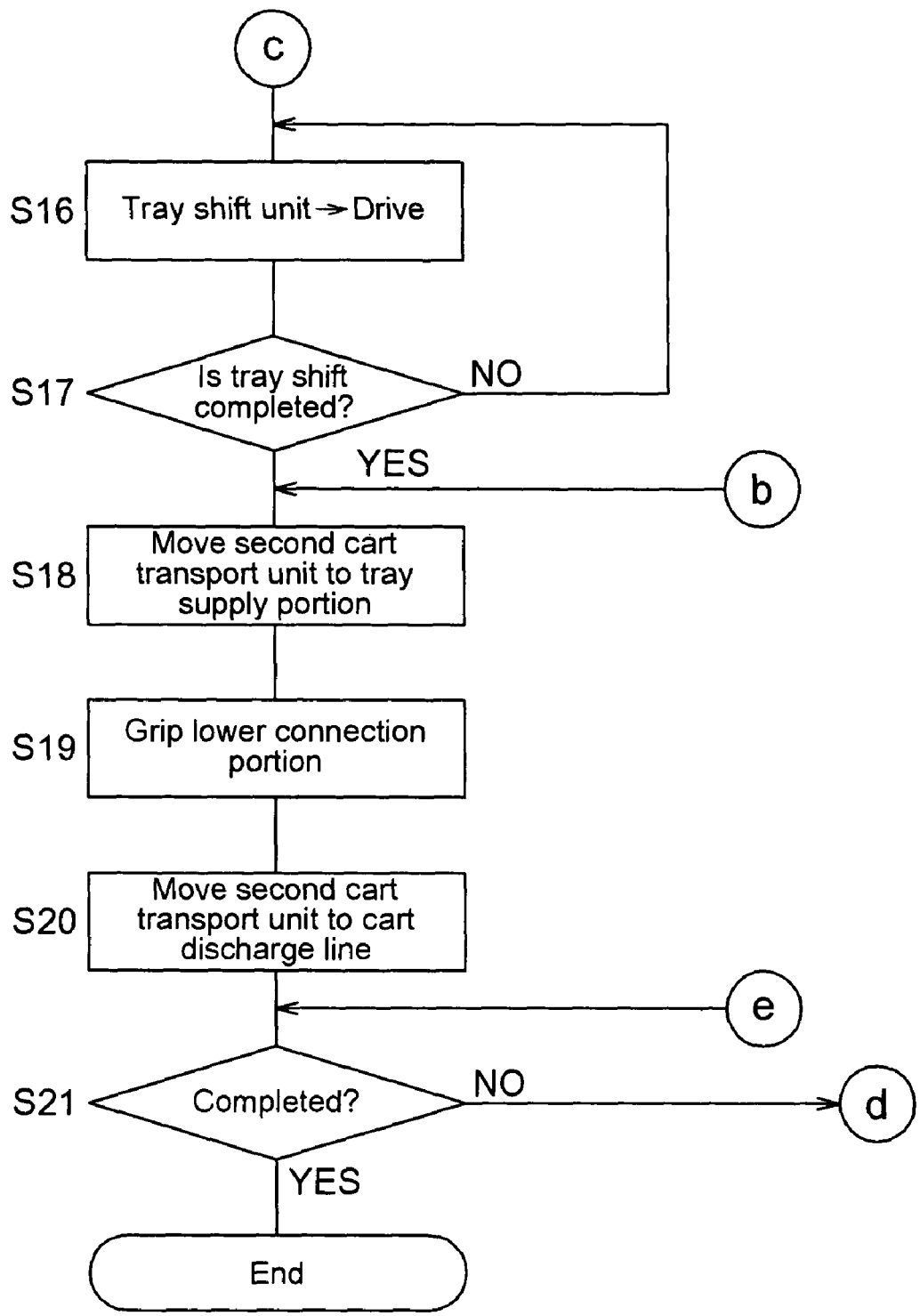
FIG. 16 is a flow chart continued from FIG. 15.

As shown in flowcharts in FIGS. 14 to 16, based on the prescription data inputted from the server 8 and so on (Step S1), the control unit 10 drives the supply lifter (Step S2) to supply the trays 7 to the tray transport line 3. In the tray transport line 3, rollers (not shown) are driven to transport the supplied trays 7 to the medicine dispensing unit 4. When a tray 7 is moved to the medicine dispensing unit 4, the tray is stopped by a stopper (not shown), which causes the indicated medicine to be discharged. If all of the medicine cannot be dispensed by one medicine dispensing unit 4, the tray 7 is also stopped at another medicine dispensing unit 4 to allow the medicine to be dispensed.

If the medicine is completely dispensed, patient data such as the patient name and so on, medicine data such as the prescribed medicine name and so on, and address data such as the ward name and so on are printed on the identification card 12 that is attached to the tray 7 by the card rewriting unit 5 (Step S4). If anything is printed, it is rewritten. When printing of the identification card 12 is completed, it is determined whether or not the medicine contained in the tray 7 is a regular prescription (Step S5-1). If it is the regular prescription, the processing operation is shifted to the next step. If it is determined that the medicine is not the regular prescription but a temporary prescription, the tray 7 is stacked in the stack lifter 6 (step S5-2). Thus, even in the case of an urgent prescription for a patient whose condition is rapidly changing, it is possible to put the tray on standby in the stack lifter 6 without storing the tray in the cart 8 to promptly cope with the urgency.

In the tray discharge unit 2, the second optical communication portion 27 of the tray supply portion 14 communicates with the third optical communication portion 61 of the second cart transport unit 9b. It is determined based on the detection result of the detection sensor 60 of the second cart transport unit 9b whether or not the cart 8 is positioned at the tray supply portion 14 (Step S6). If the cart 8 is not positioned at the tray supply portion 14, the first optical communication portion 16 of the cart standby portion 13 communicates with the third optical communication portion 61 of the first cart transport unit 9a and the first cart transport unit 9a is moved to the empty cart 8 closest to the tray discharge unit 2 based on the detection result of the detection sensor 60 of the first cart transport unit 9a (Step S7). If the cart is positioned at the tray supply portion 14, the processing is shifted to Step S18 which will be described hereinafter.

In this case, the first cart transport unit 9a moves at a high speed until it is determined by the detection sensor 60 positioned at the side of moving direction of the first cart transport unit 9a that the first cart transport unit 9a is approaching the cart 8 by a predetermined distance. When it is determined that the first cart transport unit 9a has approached the cart 8 by a predetermined distance, the speed is reduced. In detail, the first cart transport unit 9a moves at the high speed (constant speed) until the distance to the cart 8 becomes a first set distance; and if the distance has reached the first distance, the moving speed of the first cart transport unit 9a is decelerated by one-fourth. When the distance to the cart 8 becomes a second set distance, which is smaller than the first set distance, the moving speed is further decelerated by one-sixth with respect to the moving speed at the high speed.

When a predetermined time has passed and the position deviation detection sensor 59 does not detect the reflection plate 47 (Step S8; NO), it is determined that the position of the cart 8 has deviated in the direction perpendicular to the cart supply line 48 and an error is informed (Step S12).

When the position deviation detection sensor 59 detects the reflection plate 47 (Step S8; YES), the first cart transport unit 9a is stopped (Step S9). Then, it is determined based on the detection signal of the cart detection sensor 58 whether or not a gripping operation of the grip members 55 is possible (Step S10). This decision is conducted in accordance with whether or not at least two optical sensors of each cart detection sensor 58 are positioned at both sides of the cart transport unit 9a.

If it is decided that a gripping operation of the grip members 55 is possible (Step S10; YES), the motor (not shown) is driven to rotate the grip arms 64a, 64b so as to grip the lower connection portion 41 (Step S11). At this time, the lower connection portion 41 is guided as both side surfaces are pushed by the side plate portions 55c of each of the grip arms 64a, 64b, thereby allowing correction of the cart even if the cart is positioned so that the lower connection portion 41 is skewed to a certain degree with respect to the direction perpendicular to the cart supply line 48.

If it is determined that a gripping operation of the grip members 55 is impossible, that is to say, the skewed angle of the lower connection portion 41 with respect to the direction perpendicular to the cart supply line 48 is too large for the grip arms 64a, 64b to grip the lower connection portion 41 (Step S10; NO), an error is informed (Step S12).

If the lower connection portion 41 is held by the grip arms 64a, 64b, the first cart transport unit 9a is moved to the cart standby portion 13 of the tray discharge unit 2 (Step S13). Even when moving to the cart standby portion 13, the first cart transport unit 9a is moved at high speed until the unit has traveled a certain distance; and if the unit has approached the certain distance 1, the unit is stopped or the speed is decreased. In detail, the first cart transport unit 9a is moved at the high speed until the distance to the cart standby portion 13 becomes a first set distance; the moving speed is decelerated by one-sixth until the distance becomes a second set distance from the first distance; and when the distance becomes the second distance, the unit is stopped. At this time, the pusher 34 of the cart shift member 15 is moved to the end portion of the cart standby portion 13. Also, the guide piece 20 of the guide member 17 is elevated to prepare for moving the cart 8 to the cart standby portion 13. Moving the pusher 34 and elevating the guide piece 20 are conducted provided that the preceding cart 8 is not positioned at the cart standby portion 13. Thus, failure caused by the carts 8 colliding against each other is prevented.

The first transport unit 9a is further driven to move the empty cart 8 to the cart standby portion 13 based on the detection signal of the detection sensor 60. At this time, the pulse number of the applied voltage to the drive motor 52 is controlled to adjust the distance to a distance calculated based on the detection signal of the detection sensor 60.

When the empty cart 8 is positioned at the cart standby portion 13, the guide piece 20 of the guide member 17 is lowered to prevent the cart 8 from deviating at the time of shifting the cart 8. Also, the gripping state of the grip member 55 is released and the first cart transport unit 9a retreats from the empty cart 8. It is decided/based on the detection result of the detection sensor 60 obtained from communication between the second optical communication portion 27 and the third optical communication portion 61 whether or not the cart 8 is positioned at the tray supply portion 14. If no cart 8 is positioned at the tray supply portion 14, the pusher 34 of the cart shift member 15 is moved so that the empty cart 8 is moved to the tray supply portion 14 from the cart standby portion 13 (Step S14). The empty cart 8 is moved while it is prevented by the guide member 17 (guide piece 20 and guide roller 30) and the guide cover 31 from moving laterally.

When the cart 8 is moved to the tray supply portion 14, the electromagnetic portion 28 is excited to attract and position the cart 8 (Step S15). Then, the tray shift unit 21 is driven to continuously store the medicine containing trays 7 in the storage area 46 (Step S16). As the cart 8 is positioned by the electromagnetic portion 28 and guided by the guide roller 30, the cart is never displaced during the tray storage work.

Figure 13:
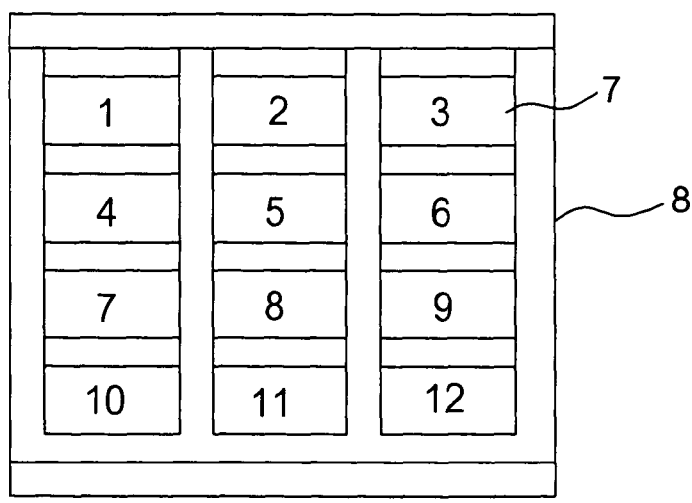
FIGS. 13(a), (b), (c) are front views showing examples of the trays stored in the cart.
Figure 13:
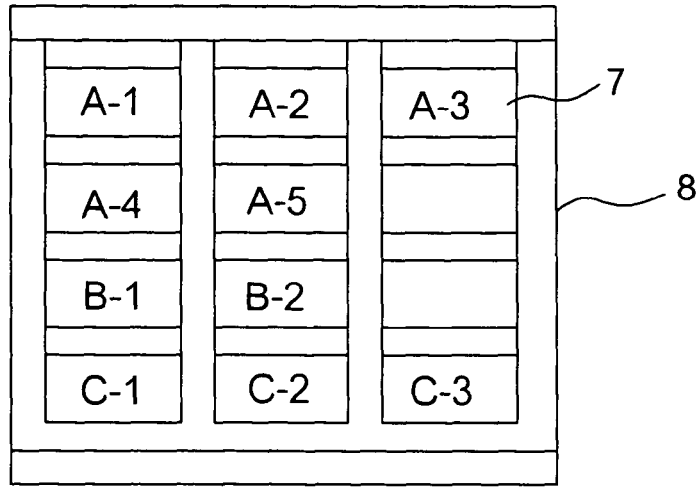
Figure 13:
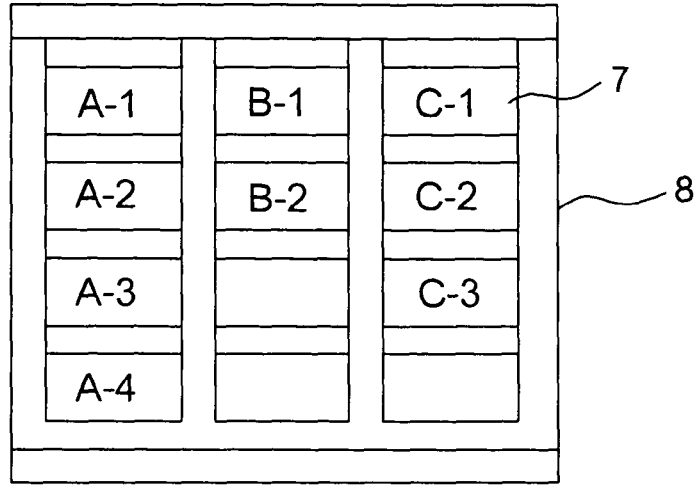

The position of the storage area 46 in which the trays 7 are stored can be set, for example, as shown in FIGS. 13(*a*) to 13(*c*).

FIG. 13 (*a*) shows an example in which the trays 7 are stored from 1st to 12th in accordance with the receipt number of the prescription data accepted by the server 78. FIG. 13 (*b*) shows an example in which storage stages are differentiated by the hospital wards. The trays A-1 to A-5 for hospital ward A are stored in the first and second stages; the trays B-1 and B-2 for hospital ward B are stored in the third stage; and the trays C-1 to C-3 for hospital ward C are stored in the fourth stage. FIG. 13(*c*) shows an example in which the storage rows are differentiated by the hospital wards. In this case, differing the colors of the trays 7 by the hospital wards is preferable because the operator can easily discriminate them. In the case of cart 8, as shown in FIG. 8, the guide grooves 45 are provided with a half pitch with respect to the storage space of the tray 7, and thus it is possible to store the trays 7 in the stages shifted by a half pitch, which allows the trays to be discriminated by the hospital wards. If the number of guide grooves 45 is increased, it is possible to provide the trays 7 with various pitches such as one-third pitch with respect to the storage space of the tray 7.

When storage work of the trays 7 into the cart 8 is completed (Step S17: YES), the second cart transport unit 9b is driven (Step S18) and then the lower connection portion 41 of the cart 8 positioned at the tray supply portion 14 is gripped by the grip arm 64 of the grip member (Step S19). Subsequently, the electromagnetic portion 28 is demagnetized to release the attracted state of the cart 8. After that, the guide roller 30 is elevated to allow the cart 8 to move to the cart discharge line 49. Then, the second cart transport unit 9b is driven to move the cart to a predetermined position on the cart discharge line 49 (Step S20).

In a similar way, the empty cart 8 of the cart supply line 48 is transported to the tray discharge unit 2 by the cart transport unit 9a. After the trays 7 are stored, the cart 8 is moved to the cart discharge line 49. In the cart discharge line 49, the carts 8 may be disposed at even intervals, though it is possible to dispose the carts 8 at different intervals in accordance with the transport address of the carts 8. For example, if there are three carts 8 to be transported to hospital ward A, these carts are disposed at even intervals. Subsequently, if there are two carts 8 to be transported to hospital ward B, these carts can be disposed at even intervals and at a large distance from the group of carts 8 to be transported to hospital ward A. This allows the operator to easily discriminate the carts 8 during transportation to each of the hospital wards, which would be convenient.

Thereafter, with respect to all prescription data inputted in the control unit 10, when the operations of dispensing the medicine to the trays 7 and storing the trays 7 in the cart 8 are completed (Step S21: YES), the processing is terminated. If not completed (Step S21: NO), the processing is returned to Step S1 to repeat the same processing.

The above processing is effective in a case in which the medicines are contained in the trays 7 and the trays 7 are stored in the cart 8 at night or so.

In the above embodiment, the cart transport unit 9 is provided with the detection sensors 55, though it is also preferable to further provide a vibration sensor. Even if the detection sensors 55 are not able to detect obstacles, the vibration sensor detects vibration generated when the cart transport unit 9 collides with an obstacle. Based on the detected vibration, an error is informed and the cart transport unit 9 is stopped. This arrangement more reliably prevents trouble that would be caused during movement of the cart transport unit 9.

The invention claimed is:

1. A cart transport apparatus for transporting a cart provided with a plurality of storage areas in each of which trays with medicine contained therein can be stored,
   the cart comprising a plurality of support panels juxtaposed to each other, a lower connection member connecting the lower end portions of the plurality of support panels, and casters positioned below the lower connection member,
   the cart transport apparatus comprising:
   a frame having wheels which can be driven to rotate, the frame being movable beneath the lower connection member of the cart;
   a first grip member for gripping the lower connection member of the cart;
   a cart detection portion for detecting the lower connection member of the cart; and
   a control portion for driving the grip member based on a detection signal from the cart detection portion to grip the lower connection member,
   the first grip member comprising a pair of grip arms disposed on the frame so as to be shifted from each other in a longitudinal direction of the lower connection member, the pair of grip arms being capable of pivoting in synchronization with each other so as to guide the lower connection member from side surfaces thereof,
   the cart detection portion comprising a plurality of groups of sensors, wherein the sensors in each group of sensors are juxtaposed in a cart transporting direction within a range of a width of the lower connection member to detect the lower connection member, wherein at least a first group of the groups of sensors is disposed on a first side of the frame and a second group of the groups of sensors is disposed on a second side of the frame,
   the control portion driving the grip member to grip the lower connection member when receiving the detection signal that both the first group of the groups of sensors and the second group of the groups of sensors detect the lower connection member.

2. The cart transport apparatus as in claim 1, wherein each of the grip arms comprises an upper plate portion, a lower plate portion and a side plate portion for guiding three surfaces of the lower connection member, and wherein the side plate portions of the grip arms can guide side surfaces of the lower connection portion, respectively.

3. The cart transport apparatus as in claim 2, wherein the cart transport apparatus further comprises a position deviation sensor for detecting a reflection plate provided on the lower connection member of the cart, the position deviation sensor being provided on a center portion of the frame.

4. The cart transport apparatus as in claim 1,
   wherein the control portion is operable to determine whether or not the cart is positioned at an appropriate position based on detection signals of the groups of sensors, and if the cart is not positioned at the appropriate position, the control portion stops driving the grip member.

5. The cart transport apparatus as in claim 4, further comprising:
   a detection portion for detecting an obstacle during movement of the frame,
   wherein, when the frame approaches the cart, if the control portion determines that the frame has moved by a predetermined distance based on a detection signal of the detection portion, the control portion reduces the moving speed of the cart.

6. The cart transport apparatus as in claim 4, further comprising:
   a communication portion operable to receive a state of transport address of the cart,
   wherein the control portion is operable to determine whether or not the cart can be transported based on the state of transport address of the cart received at the communication portion.

7. The cart transport apparatus as in claim 1, further comprising:
   a detection portion for detecting an obstacle during movement of the frame,
   wherein, when the frame approaches the cart, if the control portion determines that the frame has moved to a predetermined distance based on a detection signal of the detection portion, the control portion reduces the moving speed of the cart.

8. The cart transport apparatus as in claim 7, further comprising:
   a communication portion operable to receive a state of transport address of the cart,
   wherein the control portion is operable to determine whether or not the cart can be transported based on the state of transport address of the cart received at the communication portion.

9. The cart transport apparatus as in claim 1, further comprising:
   a communication portion operable to receive a state of transport address of the cart,
   wherein the control portion is operable to determine whether or not the cart can be transported based on the state of transport address of the cart received at the communication portion.

10. The cart transport apparatus as in claim 1, wherein the cart transport apparatus further comprises a second grip member having a pair of grip arms, the first and second grip members being disposed on opposite sides of the frame.

* * * * *